United States Patent
Suzuki et al.

(10) Patent No.: US 10,812,763 B2
(45) Date of Patent: Oct. 20, 2020

(54) IMAGE PROJECTION APPARATUS

(71) Applicant: SUBARU CORPORATION, Tokyo (JP)

(72) Inventors: Kei Suzuki, Tokyo (JP); Iwao Murata, Tokyo (JP); Yuichi Nagai, Tokyo (JP); Yasunori Shibao, Tokyo (JP); Marosuke Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 85 days.

(21) Appl. No.: 16/207,425

(22) Filed: Dec. 3, 2018

(65) Prior Publication Data

US 2019/0199983 A1    Jun. 27, 2019

(30) Foreign Application Priority Data

Dec. 22, 2017   (JP) .................. 2017-247074

(51) Int. Cl.
   *H04N 9/31*    (2006.01)
   *G03B 21/14*   (2006.01)
   *B64F 5/10*    (2017.01)

(52) U.S. Cl.
   CPC .......... *H04N 9/3147* (2013.01); *G03B 21/14* (2013.01); *H04N 9/3182* (2013.01); *H04N 9/3185* (2013.01); *H04N 9/3188* (2013.01); *H04N 9/3194* (2013.01); *B64F 5/10* (2017.01)

(58) Field of Classification Search
   CPC ..... H04N 9/3147; H04N 9/3182; G03B 21/14
   See application file for complete search history.

(56) References Cited

U.S. PATENT DOCUMENTS

| 2011/0166824 A1 | 7/2011 | Haisty et al. |
| 2011/0169924 A1* | 7/2011 | Haisty ............ H04N 13/30 348/51 |
| 2013/0286187 A1 | 10/2013 | Slesinski |
| 2014/0160115 A1 | 6/2014 | Keitler et al. |
| 2016/0011583 A1 | 1/2016 | Matsubara et al. |

FOREIGN PATENT DOCUMENTS

| JP | 2004-46730 A | 2/2004 |
| JP | 2004-221165 A | 8/2004 |
| JP | 2009-123370 A | 6/2009 |
| JP | 2010-131020 A | 7/2012 |
| JP | 2013-73511 A | 4/2013 |
| JP | 2013-161308 A | 8/2013 |

(Continued)

OTHER PUBLICATIONS

Extended European Search Report issued in corresponding European Patent Application No. 18 20 8298 dated May 24, 2019.

(Continued)

*Primary Examiner* — Ryan D Howard
(74) *Attorney, Agent, or Firm* — Troutman Pepper Hamilton Sanders LLP

(57) ABSTRACT

An image projection apparatus includes: a projector; and a projection control apparatus. The projector projects an image. The projection control apparatus causes the projector to project a processing information regarding a processing or an assembly information regarding an assembly performed for a target to be manufactured on a surface of the target.

11 Claims, 7 Drawing Sheets

(56) References Cited

FOREIGN PATENT DOCUMENTS

| | | |
|---|---|---|
| JP | 2013-230547 A | 11/2013 |
| JP | 2013-23204 A | 2/2014 |
| JP | 2014-37016 A | 2/2016 |
| JP | 2016-23204 A | 2/2016 |
| JP | 2017-111254 A | 6/2017 |
| WO | 2014/167736 A1 | 10/2014 |

OTHER PUBLICATIONS

Notice of Reasons for Refusal issued in corresponding Japanese Patent Application No. 2017-247074 dated Oct. 3, 2019 (with English translation).
Notice of Reasons for Refusal issued in corresponding Japanese Patent Application No. 2017-247074 dated Apr. 28, 2020, with machine translation.

* cited by examiner

IMAGE PROJECTION APPARATUS

CROSS-REFERENCE TO RELATED APPLICATIONS

The present application claims priority from Japanese Patent Application No. 2017-247074 filed on Dec. 22, 2017, the entire contents of which are hereby incorporated by reference.

BACKGROUND

1. Technical Field

The present invention relates to an image projection apparatus.

2. Related Art

When aircrafts, automobiles, and the like are manufactured, a perforating operation of making a hole on a target to be manufactured is performed. As technology for assisting with the perforating operation, for instance, Japanese Unexamined Patent Application Publication (JP-A) No. 2012-131020 is disclosed. In JP-A No. 2012-131020, the angle between a tool of a perforation machine and a surface of a target is measured, and a symbol indicating an angle as a measurement result is displayed.

SUMMARY OF THE INVENTION

An aspect of the present invention provides an image projection apparatus including: a projector configured to project an image; and a projection control apparatus configured to cause the projector to project, on a surface of a target to be manufactured, a processing information regarding a processing or an assembly information regarding an assembly performed for the target.

DETAILED DESCRIPTION

Figure 1:
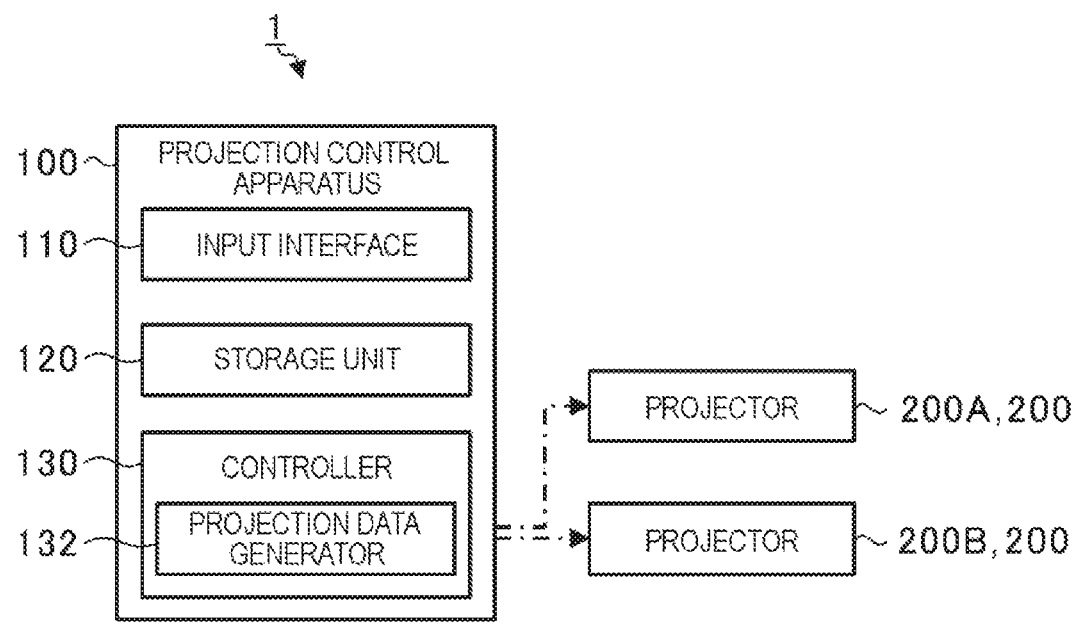
FIG. 1 is a block diagram illustrating a configuration of an image projection apparatus according to a first example.

Hereinafter, preferred examples of the present invention will be described in detail with reference to the appended drawings. Dimensions, materials, other specific numerical values, and the like in the examples are merely instances to facilitate the understanding of the invention, but do not limit the present invention unless otherwise stated. The appended drawings are schematic and are not intended to be drawn to scale. Note that, in this specification and the appended drawings, structural elements that have substantially the same function and structure are denoted with the same reference numerals, and repeated description of these structural elements is omitted.

After a perforating operation, a countersinking operation of conically chamfering the edge of a hole that is made, an assembling operation of inserting a fastener through a hole to couple targets, and the like are performed. When a countersinking operation is performed, an operator handwrites a countersink diameter or the like on the target to eliminate an operational error, and then begins the countersinking operation. The information written on the target is deleted when a swarf caused in the countersinking operation is removed. Then, when an assembling operation is performed, an operator handwrites a fastener diameter or the like on the target to eliminate an operational error, and then begins the assembling operation.

In this way, an operation is performed after information regarding the operation is handwritten on a target. Accordingly, the manufacturing efficiency of the target is not favorable. In addition, the information regarding an operation is handwritten on targets as many times as targets, so that the manufacturing efficiency of a target is not also favorable from this point of view.

It is desirable to provide an image projection apparatus that allows a target to be efficiently manufactured.

First Example

FIG. 1 is a block diagram illustrating the configuration of an image projection apparatus 1 according to a first example. FIG. 1 illustrates a flow of signals with a one-dot chain line arrow. The image projection apparatus 1 includes a projection control apparatus 100, and two projectors 200A and 200B. The image projection apparatus 1 uses so-called projection mapping technology that projects an image on not only a flat screen, but also a curved surface or a surface of three-dimensional object. The image projection apparatus 1 projects an image in association with a surface of a target on which the image is projected such that the image is pasted onto the surface of the target.

Examples of the projectors 200A and 200B include digital light processing (DLP) projectors and liquid crystal projectors. The projectors 200A and 200B project images on a target under the control of the projection control apparatus 100. A target in the first example is, as described below, a component to be manufactured in the manufacturing process of an aircraft (e.g. component of the body). If there is no need to distinguish between the projectors 200A and 200B, the following describes them as the projector(s) 200. Although the image projection apparatus 1 includes the two projectors 200, the number of projectors 200 is not limited to two, but may also be one, or three or more.

Examples of the projection control apparatus 100 include a personal computer. The projection control apparatus 100 causes the projector 200 to project an image. The projection control apparatus 100 includes an input interface 110, a storage unit 120, and a controller 130. Note that the projection control apparatus 100 is not limited to a personal computer, but may also be configured, for instance, as a dedicated apparatus, built in any of the projectors 200, or incorporated into a portable device such as a tablet computer.

Examples of the input interface 110 include a mouse, a keyboard, and a touch panel. The input interface 110 receives a manipulation of a user, and transmits input information indicating a manipulation result to the controller 130.

Examples of the storage unit 120 include a hard disk drive. The storage unit 120 stores image data from which a projection image to be projected by the projector 200 originates.

The controller 130 includes a microcomputer including a central processing unit (CPU), a ROM in which a program and the like are stored, and a RAM serving as a work area. The controller 130 performs integrated control on the whole of the projection control apparatus 100.

The controller 130 functions as a projection data generator 132 by executing a program. The projection data generator 132 generates projection data indicating a projection image to be projected on a target serving as a projection target on the basis of image data stored in the storage unit 120. The generated projection data is transmitted to the projector 200. Note that the projection data generator 132 is not limited to the mode in which projection data are generated on the basis of image data stored in the storage unit 120, but, for instance, the projection data generator 132 may also generate projection data on the basis of image data acquired through communication via a local area network (LAN) or the like.

Note that, in the first example, a target on which a projection image is projected is a component of the body of an aircraft, and thus the projection image is projected on a curved surface in some cases. Then, the image projection apparatus 1 calibrates the projection image such that the image projected on the target does not look distorted because of the curved surface when a person observes the image from a predetermined fixed point. For instance, when a circle is displayed on a bent part of the target, an ellipse whose long axis serves as the bending direction is projected on the target. In this case, the projection data generator 132 processes the image data of the circle into the projection data of an ellipse on the basis of data indicating the shape of the surface of the target on which the projection image is projected, and the projection position of the projector 200 for transmission to the projector 200. Note that the following sometimes refers to the surface of the target on which the projection image is projected as projection surface. In addition, when a projection image is calibrated, the projection image may be divided into lattice and projected, and the generation of projection data may be adjusted such that the shape of the lattice does not look distorted in an image actually displayed on a curved surface of a target.

Figure 2:
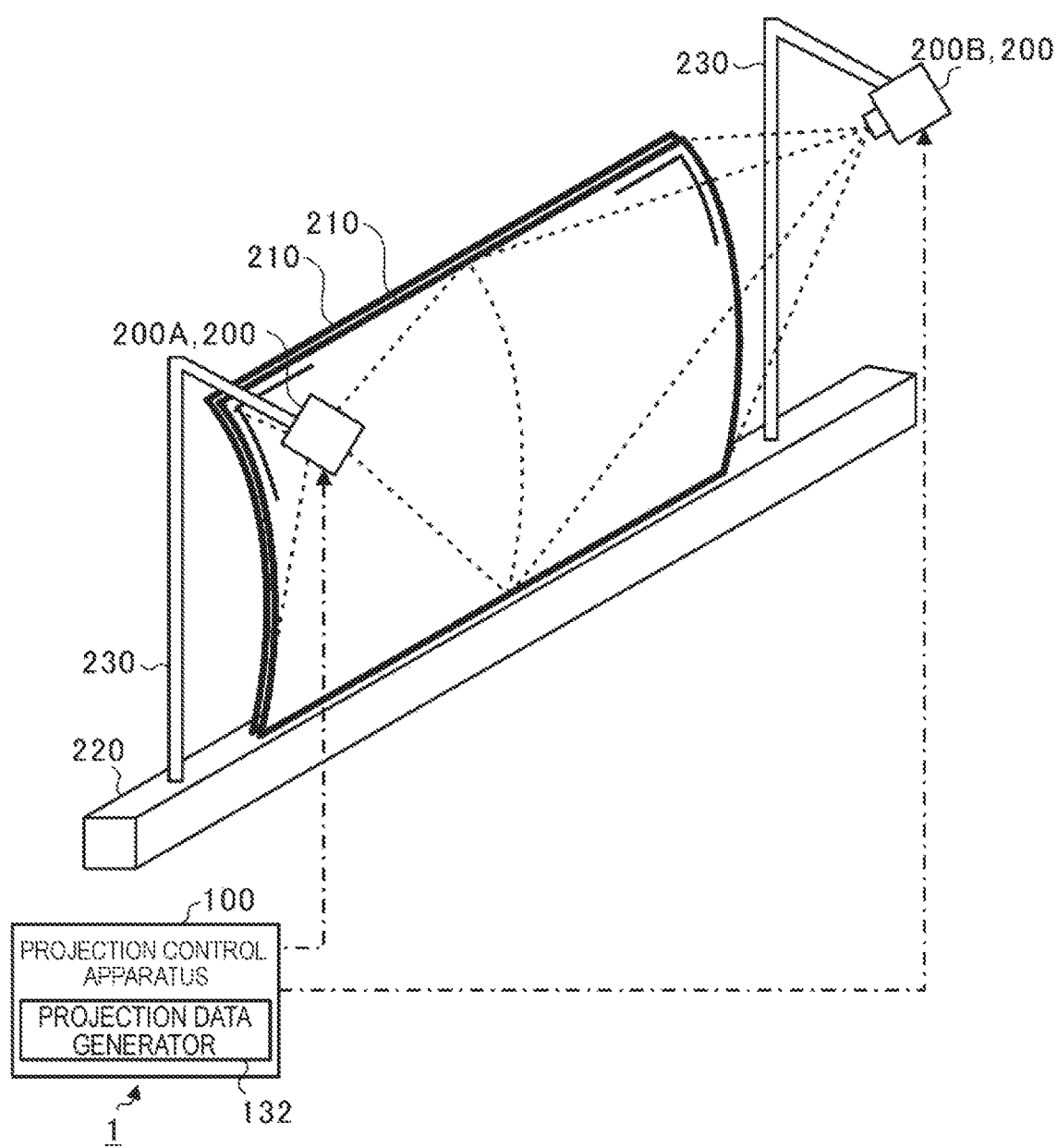
FIG. 2 is a perspective view illustrating a target on which a projection image is projected, and an instance in which a projector is installed.

FIG. 2 is a perspective view illustrating a target 210 on which a projection image is projected, and an instance in which the projectors 200 are installed. FIG. 2 illustrates a scene of the manufacturing process of an aircraft. FIG. 2 illustrates a flow of signals with a one-dot chain line arrow. In addition, FIG. 2 schematically illustrates projection light radiated from the projector 200 with dashed lines.

The target 210 is a component of the body of an aircraft to be manufactured, and is shaped like a curved plate in some cases. In addition, FIG. 2 illustrates that the two targets 210 are placed together. A jig 220 is substantially shaped like a stick, and provided with a slit (not illustrated) in the longitudinal direction. Then, a side of the targets 210 that are placed together is inserted into the slit of the jig 220. This allows the targets 210 that are placed together to stand up with the support of the jig 220. Note that the jig 220 does not have to be substantially shaped like a stick. A method for supporting the targets 210 is not limited to the method for supporting the target 210 by inserting the target 210 into a slit.

Both sides of the jig 220 across the targets 210 are provided with stick-shaped supports 230. The tip of the support 230 on one (left side in FIG. 2) of the sides is provided with the projector 200A, and the tip of the support 230 on the other side (right side in FIG. 2) is provided with the projector 200B. The projectors 200 are disposed to have the projection units face a surface of the targets 210 which is irradiated with projection light from the projection units. Note that the supports 230 that support the projectors 200 do not have to be shaped like sticks. The mode in which the supports 230 are provided on both sides of the jig 220 is not limitative.

The projector 200A irradiates, in FIG. 2, the left half of the surface of the targets 210 with projection light, and the projector 200B irradiates, in FIG. 2, the right half of the surface of the targets 210 with projection light. The projection light of the projector 200A and the projection light of the projector 200B are divided into left and right sides near the center of the targets 210. That is, in FIG. 2, the projection light of the projector 200A and the projection light of the projector 200B are combined to display an image of the whole projection surface of the targets 210. Note that at least part of the projection light of the projector 200A and part of the projection light of the projector 200B may also be overlapped to display a projection image. In this case, projection images in which a projection image of the projector 200A and a projection image of the projector 200B both look the same when viewed from a predetermined fixed point are projected from the projectors 200A and 200B on the projection light overlapping area. In addition, when at least parts of the projection light beams overlap, projection data generated by blending an image of the overlapping area on the projector 200B side with an image of the overlapping area on the projector 200A side may be transmitted to the projector 200A, and projection data generated by blending an image of the overlapping area on the projector 200A side with an image of the overlapping area on the projector 200B side may be transmitted to the projector 200B. This displays, on the overlapping areas, projection images in which a projection image of the projector 200A and a projection image of the projector 200B are integrated.

The following describes an instance in which a perforating operation of making a hole on the target 210, a countersinking operation of conically chamfering the edge of the hole, an assembling operation of inserting a fastener through the hole to couple the two targets 210, and an inspecting operation of inspecting whether the operations are performed as illustrated in the drawings are performed.

Before a perforating operation is begun, information indicating a position at which a perforation guide sheet used in the perforating operation is disposed is projected on the projection surface of the target 210. The perforation guide sheet is a sheet member provided in advance with a hole indicating the position of a perforating operation, and serves as an index of a perforation position. That is, the perforation guide sheet is a member used to make a hole at a regular hole position. Note that the perforation guide sheet may also be shaped like a plate. Examples of the information indicating a position at which a perforation guide sheet is disposed include a polygonal chain indicating, as illustrated in FIG. 2, a corner position of a perforation guide sheet. Note that the information indicating a position at which a perforation guide sheet is disposed is not limited to a polygonal chain, but, for instance, may be an arrow, a point, or text indicating a corner position of a perforation guide sheet. The information indicating a position at which a perforation guide sheet is disposed is displayed by an operator manipulating the input interface 110 before a perforating operation is begun. Note that the information indicating a position at which a perforation guide sheet is disposed is processing information regarding processing performed for the target 210.

On receiving input information indicating that a perforating operation is begun according to a manipulation on the input interface 110, the projection data generator 132 reads out the image data of an image indicating a position at which a perforation guide sheet is disposed from the storage unit 120. Next, the projection data generator 132 performs processing of associating the image of the read-out image data with the shape of the surface (projection surface) of the target 210 on the read-out image data to generate projection data. At this time, the projection data of the left half of the projection surface is generated on the basis of the projection position of the projector 200A, and the projection data of the right half of the projection surface is generated on the basis of the projection position of the projector 200B. Then, the projection data generator 132 transmits the projection data of the left half of the projection surface to the projector 200A, and transmits the projection data of the right half of the projection surface to the projector 200B. This projects, on the projection surface of the target 210, the information indicating a position at which a perforation guide sheet is disposed.

Once the information indicating a position at which a perforation guide sheet is disposed is projected on the projection surface of the target 210, an operator can accurately dispose a perforation guide sheet on the surface of the target 210 in accordance with the projected information.

Figure 3:
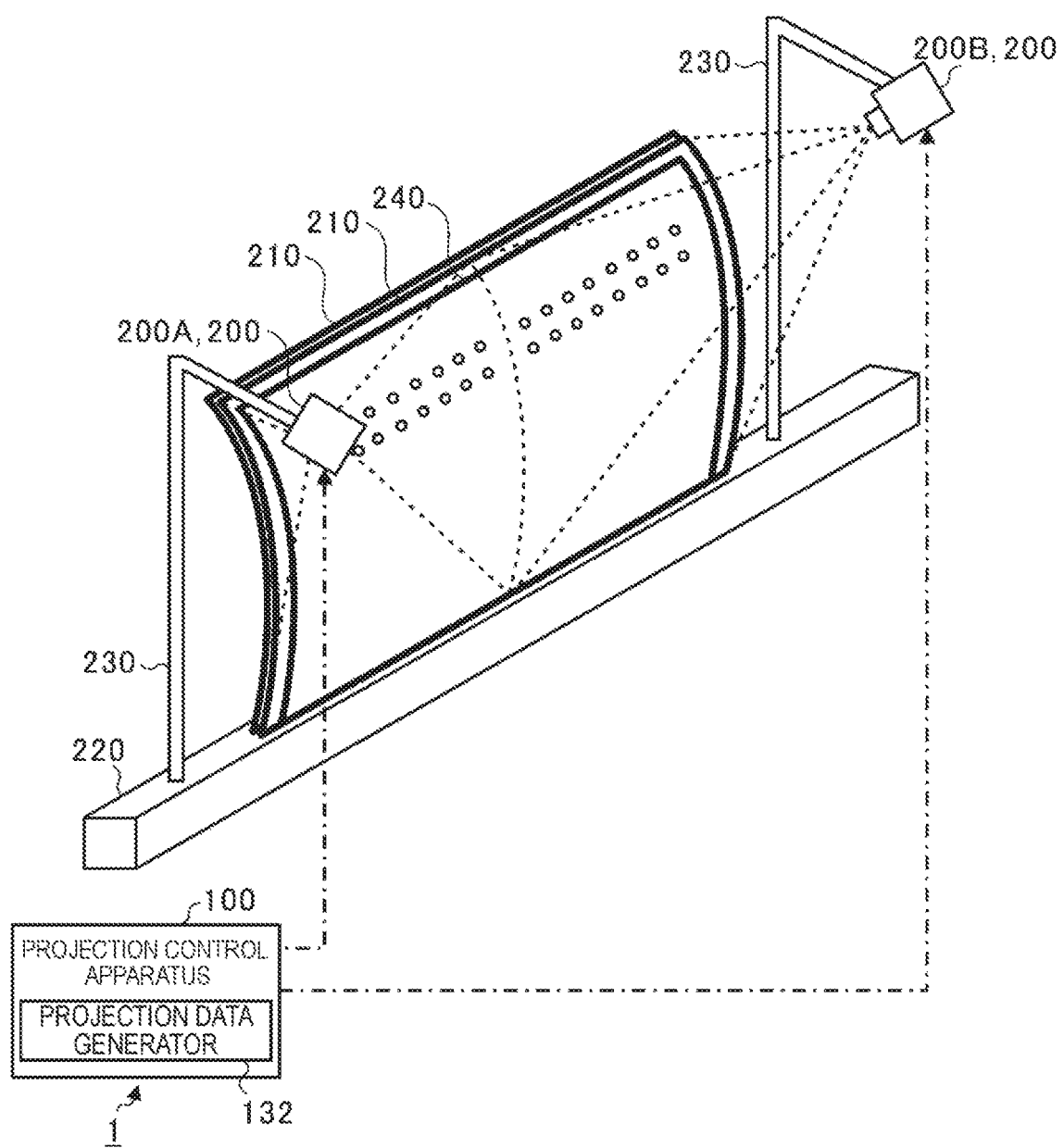
FIG. 3 is an explanatory diagram describing a perforating operation in a state in which a perforation guide sheet is disposed on the target.

FIG. 3 is an explanatory diagram describing a perforating operation in the state in which a perforation guide sheet 240 is disposed on the target 210. The perforation guide sheet 240 is provided with a hole indicating a position of a perforating operation, and thus an operator performs a perforating operation at the position of the hole on the perforation guide sheet 240. This allows the operator to make a hole at a predetermined position on the target 210 via the perforation guide sheet 240.

Next, the operator detaches the perforation guide sheet 240 from the target 210, and transitions to a countersinking operation on the hole made in the perforating operation.

Figure 4:
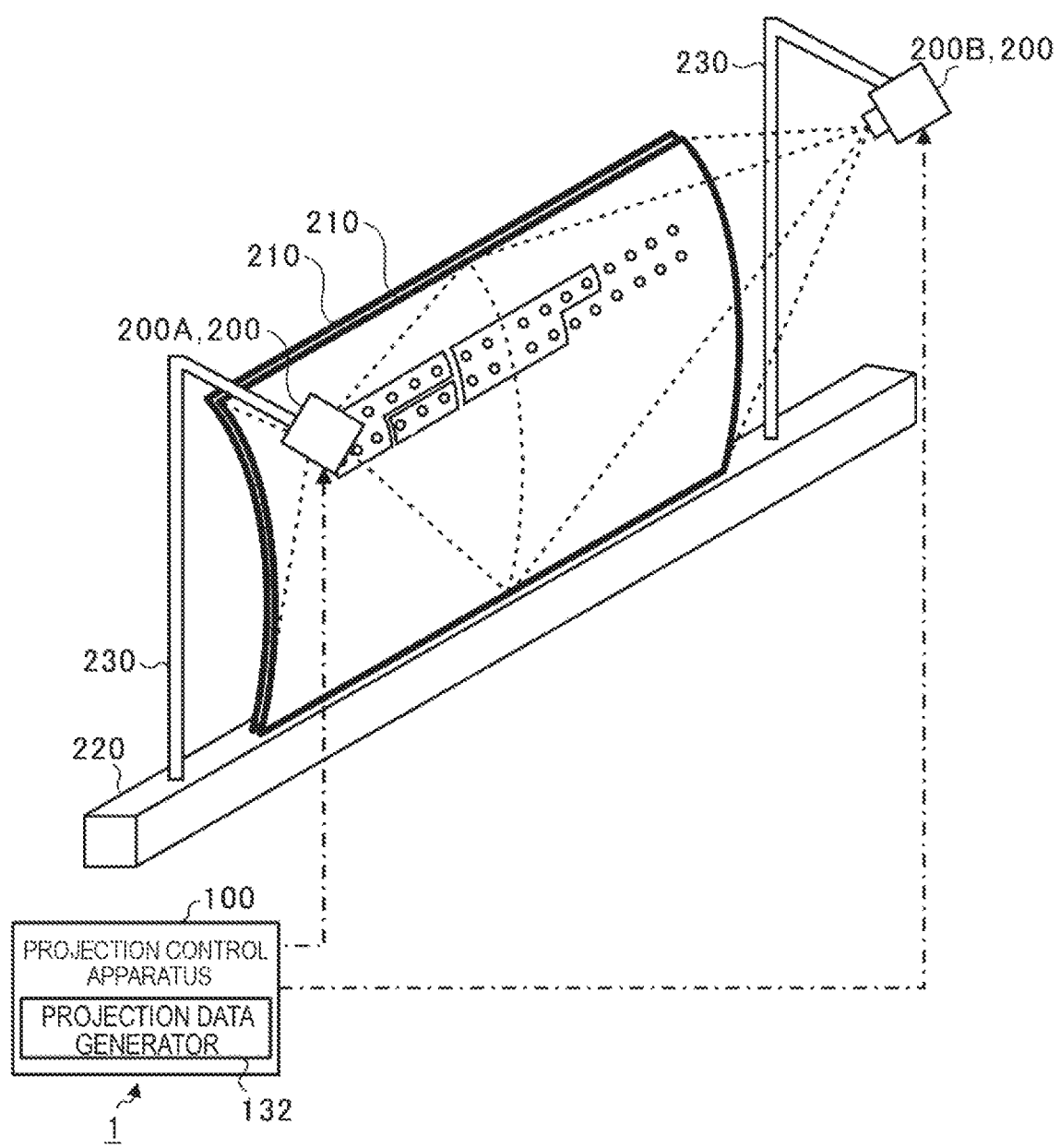
FIG. 4 is an explanatory diagram describing a countersinking operation.
Figure 5:
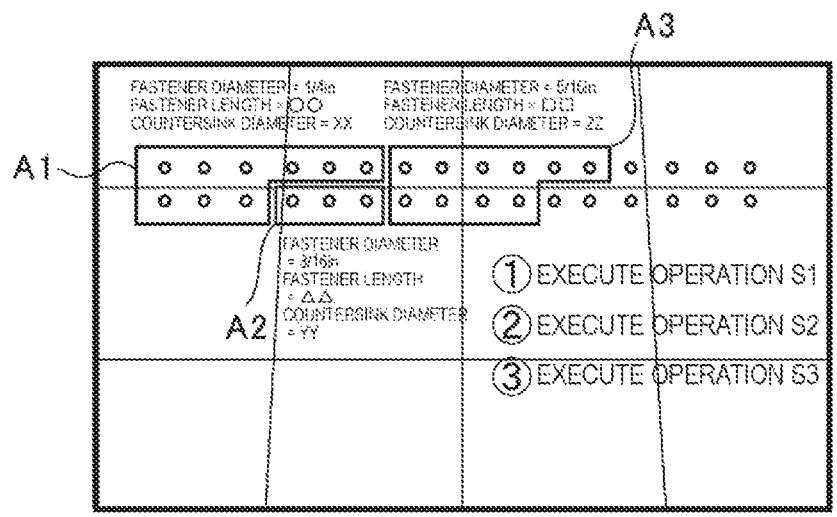
FIG. 5 is an explanatory diagram describing an image displayed on a projection surface of the target when the countersinking operation and an assembling operation are performed.

FIG. 4 is an explanatory diagram describing a countersinking operation. FIG. 5 is an explanatory diagram describing an image displayed on the projection surface of the target 210 when the countersinking operation and an assembling operation are performed.

Before a countersinking operation is begun, the operator manipulates the input interface 110 to display an image regarding operations subsequent to the countersinking operation on the target 210. Specifically, on receiving input information indicating that a countersinking operation is begun according to a manipulation on the input interface 110, the projection data generator 132 reads out the image data of an image regarding operations subsequent to the countersinking operation from the storage unit 120. Then, similarly to image data before a perforating operation is begun, the projection data generator 132 associates the image of the read-out image data with the shape of the surface of the target 210 to generate projection data, and transmits the generated projection data to the projector 200.

As illustrated in FIG. 5, before a countersinking operation is begun, information regarding processing performed on a hole made on the target 210 is displayed on the surface of the target 210 in association with the hole subjected to the processing. Specifically, holes to be countersunk are grouped for each countersink diameter and displayed on the projection surface of the target 210. For instance, frames A1, A2, and A3 are displayed around holes to be countersunk. Then, countersink diameters for countersinking the holes inside those frames A1, A2, and A3 are each displayed near the frames A1, A2, and A3. Note that the information regarding processing performed on the holes is processing information regarding processing performed for the target 210.

In addition, at this time, as illustrated in FIG. 5, information regarding an assembling operation using a hole made on the target 210 is displayed on the projection surface of the target 210 in association with the hole subjected to the operation. Specifically, holes into which fasteners are inserted are grouped for each fastener diameter and fastener length (grip), and displayed on the projection surface of the target 210. For instance, the fastener diameters and fastener lengths (grips) of fasteners inserted into holes inside the frames A1, A2, and A3 are each displayed near the frames A1, A2, and A3. Note that the information regarding an assembling operation using a hole is assembly information regarding assembly performed for the target 210.

In addition, at this time, as illustrated in FIG. 5, information indicating an operation procedure to be performed is displayed on the projection surface of the target 210. FIG. 5 illustrates an operation S1, an operation S2, and an operation S3 in operational order (numerical order). For instance, the operation S1 is a countersinking operation, the operation S2 is an assembling operation, and the operation S3 is an inspecting operation. Note that the information indicating an operation procedure is processing information regarding processing or assembly information regarding assembly performed for the target 210.

The information regarding a countersinking operation is displayed on the target 210, and thus an operator can perform a countersinking operation with reference to the displayed information.

In addition, even if the surface of the target 210 is washed to remove a swarf caused in the countersinking operation, the information displayed on the target 210 does not disappear. Accordingly, a subsequent operation (such as an assembling operation) can be smoothly followed.

Note that, by projecting projection images such that the projection light beams of the projectors 200 overlap on the projection surface or increasing the number of projectors 200, an operator may use his or her hand or the like to prevent an image displayed on the target 210 from being invisible.

In addition, FIG. 5 illustrates that countersink diameters are displayed near the frames A1, A2, and A3 around holes, but the mode in which processing information is displayed in association with holes is not limited to this mode. For instance, processing information may be displayed at the heads of leader lines and arrows extending from the frames A1, A2, and A3 around holes. In this mode, it is possible to prevent a hand or the like of an operator from hiding the image of processing information when the processing is performed. In addition, FIG. 5 illustrates that countersink diameters are displayed as numerical values (XX, YY, and ZZ in FIG. 5 represent numerical values), but the display mode of a countersink diameter is not limited to a numerical value. For instance, the frames A1, A2, and A3 may be displayed in colors distinguished according to countersink diameters to represent countersink diameters in the colors of the frames A1, A2, and A3. In addition, what is similar to the display mode of processing information may be applied to the display mode of assembly information.

In addition, FIG. 5 illustrates that a countersink diameter, a fastener diameter, and a fastener length, and an operation procedure are displayed on the projection surface of the target 210. However, information displayed on the projection surface of the target 210 is not limited thereto. For instance, a target time within which an operation is completed, and an elapsed time regarding an operation being performed may be displayed on the projection surface of the target 210. In this mode, it is possible to make an operator conscious of operation efficiency, and increase the operation efficiency. In addition, for instance, tool information regarding a tool used for a countersinking operation and an assembling operation may be displayed. In this mode, it is possible to begin an operation with reference to the displayed tool information, and increase the operation efficiency.

Once a countersinking operation is completed, an operator manipulates the input interface 110 to input the fact that the countersinking operation is completed into the projection control apparatus 100.

Figure 6:
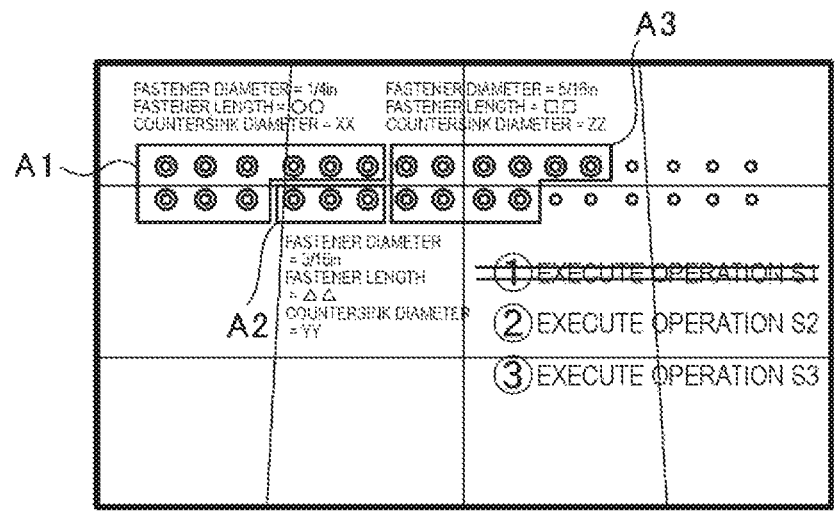
FIG. 6 is an explanatory diagram describing an image displayed on the projection surface of the target after the countersinking operation is completed.

FIG. 6 is an explanatory diagram describing an image displayed on the projection surface of the target 210 after the countersinking operation is completed. Note that FIG. 6 illustrates that countersinking inside the frames A1, A2, and A3 is completed, and the countersunk holes are illustrated in double circles.

Once the projection data generator 132 receives input information indicating that a countersinking operation is completed according to a manipulation on the input interface 110, the projection data generator 132 changes a projection image representing a countersinking operation in a projection image representing an operation procedure into a mode indicating that a countersinking operation is completed. Specifically, the projection data generator 132 generates projection data on the basis of the image data of an image in which a double strike-through is made on the text of "EXECUTE OPERATION S1" indicating a countersinking operation, and transmits the generated projection data to the projector 200. This switches the projection image of "EXECUTE OPERATION S1" to the projection image in which a double strike-through is made on the text of "EXECUTE OPERATION S1," and indicates that the operation S1 (countersinking operation) is completed.

The display mode of a completed operation in the operation procedure changes, so that an operator can check again that the operator is to transition to the next operation.

Note that the display mode indicating a completed operation is not limited to the mode in which a double strike-through is made. For instance, a mode in which the text of a completed operation is erased may also be adopted, or a mode in which the color of the text of a completed operation is changed from the color of the text of an operation that has not been completed may also be adopted.

Next, an operator transitions to an assembling operation. In the assembling operation, for instance, a rivet (fastener) having a designated fastener diameter is inserted into a designated hole, the rivet is deformed with a tool, and the targets 210 that are placed together are coupled with the rivet. When an assembling operation is performed, as illustrated in FIG. 5, information (fastener diameter and fastener length in FIG. 5) regarding the assembling operation is displayed on the targets 210. Therefore, an operator can insert an appropriate fastener into a designated hole with reference to the displayed information, and perform an appropriate assembling operation. Note that the information regarding an assembling operation which is displayed when the assembling operation is performed is not limited to a fastener diameter and a fastener length. In addition, not only the mode in which a fastener diameter and a fastener length are both displayed, but a mode in which any one of a fastener diameter and a fastener length is displayed and the other is not displayed may also be adopted.

Note that a projection image regarding the next operation may be updated at the same time when the projection image of a completed operation is updated. For instance, the notes regarding an assembling operation that is the next operation may be newly displayed at the same time when a double strike-through is made on the text of "EXECUTE OPERATION S1" indicating a countersinking operation.

Once an assembling operation is completed, an operator manipulates the input interface 110 to input the fact that the assembling operation is completed into the projection control apparatus 100.

Once the projection data generator 132 receives input information indicating that an assembling operation is completed, the projection data generator 132 changes a projection image representing an assembling operation in a projection image representing an operation procedure into a mode indicating that an assembling operation is completed, which is not, however, illustrated. That is, an image in which a double strike-through is made on the text of "EXECUTE OPERATION S2" indicating an assembling operation is displayed on the target 210.

Next, an operator transitions to an inspecting operation. Information equivalent to the information illustrated in the drawings is displayed on the target 210, and thus the target 210 can be inspected in an inspecting operation on the basis of the information displayed on the target 210. Note that the display may be replaced with the display of an inspecting operation that is the next operation at the same time when a double strike-through is made on the text of "EXECUTE OPERATION S2" indicating an assembling operation.

As described above, in the image projection apparatus 1 according to the first example, processing information regarding processing or assembly information regarding assembly performed for the target 210 to be manufactured is projected on the surface of the target 210. Therefore, the use of the image projection apparatus 1 according to the first example can eliminate a redundant operation of handwriting processing information and the like on the target 210 before the operation. In addition, the use of the image projection apparatus 1 according to the first example makes it possible to easily display processing information or assembly information in spite of a large number of targets 210.

Thus, the image projection apparatus 1 according to the first example makes it possible to efficiently manufacture the target 210.

Note that, in the first example, an operator performs a manipulation indicating that an operation is completed into the input interface 110, and the display mode of the projection image of a completed operation in a projection image representing an operation procedure accordingly changes. However, the mode in which the display mode of a projection image is manually changed is not limitative. For instance, there may be provided a camera that images the projection surface of the target 210, it may be determined whether an operation is completed on the basis of an image analysis of an image captured by the camera, and if it is determined that the operation is completed, the display mode of a projection image may be changed. In addition, for instance, there may be provided a laser that scans the projection surface of the target 210, it may be determined whether an operation is completed by determining whether the laser makes a hole at a predetermined position, and if it is determined that the operation is completed, the display mode of a projection image may be changed.

In addition, in the image projection apparatus 1 according to the first example, information indicating a position at which a perforation guide sheet is disposed is projected on the projection surface of the target 210. However, information indicating the perforation position itself may be projected on the projection surface of the target 210. In this mode, without any perforation guide sheet, a perforating operation may be performed at the position indicated by the information indicating the perforation position itself. In addition, when the targets 210 are repeatedly manufactured, the position of the jig 220, the position of the projector 200, and the positions of the targets 210 are more favorably fixed over the targets 210 within a predetermined range of accuracy.

In addition, in the first example, the projection data generator 132 may project information indicating the structure of the rear surface of the target 210 on the front surface (projection surface) of the target 210. According to this mode, it is possible to perform an operation while being conscious of the structure of the rear surface of the target 210, and thus it is possible to more efficiently manufacture the target 210.

Second Example

Figure 7:
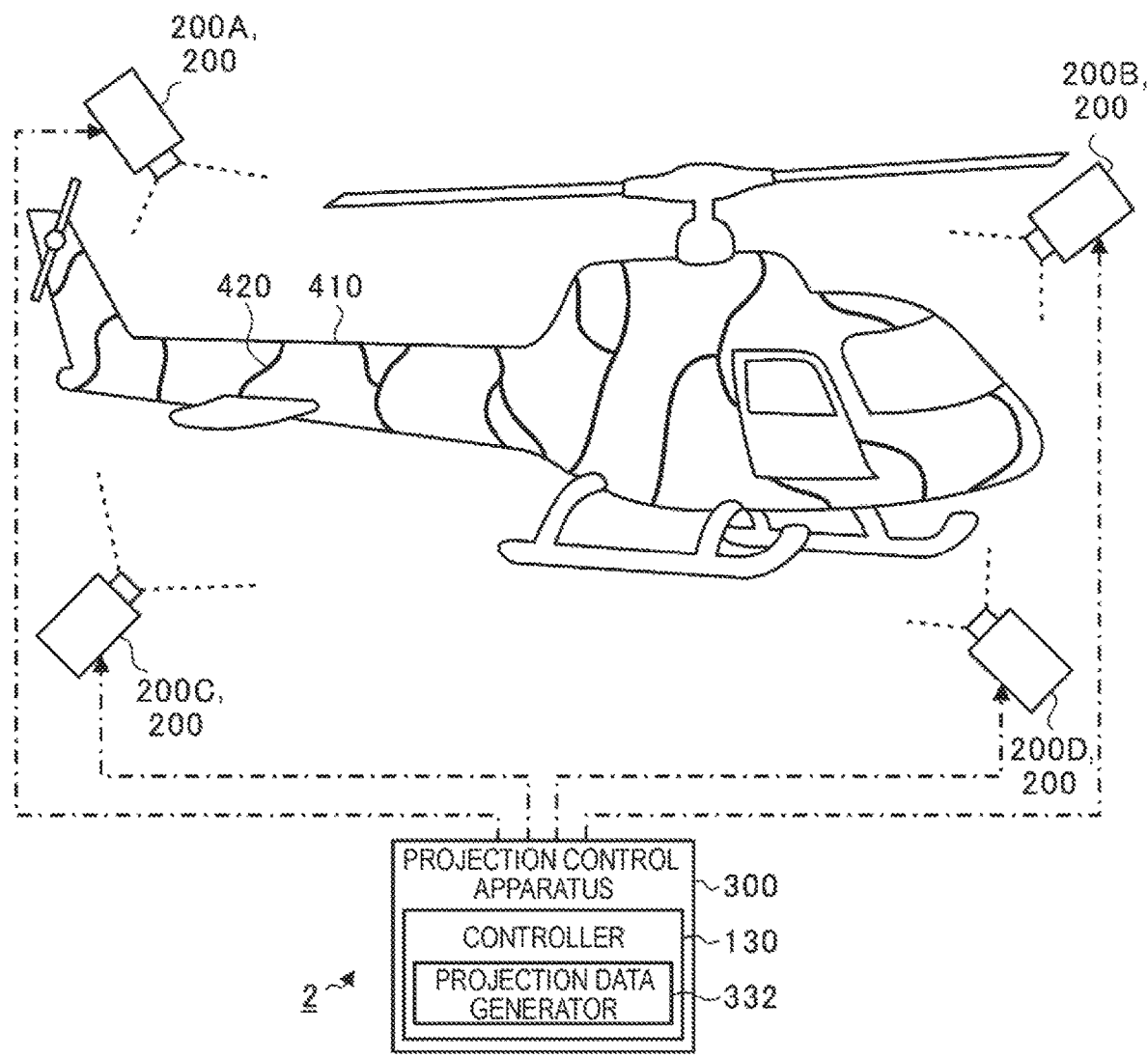
FIG. 7 is an explanatory diagram describing an image projection apparatus according to a second example.

FIG. 7 is an explanatory diagram describing an image projection apparatus 2 according to a second example. FIG. 7 illustrates a flow of signals with a one-dot chain line arrow. The image projection apparatus 2 according to the second example is applied to a scene in which the surface of an aircraft (here, helicopter) is painted. Note that the painting in FIG. 7 is a camouflage painting.

The image projection apparatus 2 includes a projection control apparatus 300, and four projectors 200A, 200B, 200C, and 200D. In addition, in the second example, a helicopter whose surface has not yet been painted is a target 410 on which a projection image is projected.

The projector 200A downwardly irradiates the surface of a helicopter that is the target 410 with projection light from behind the target 410. The projector 200B downwardly irradiates the surface of a helicopter that is the target 410 with projection light from the front of the target 410. The projector 200C upwardly irradiates the surface of a helicopter that is the target 410 with projection light from behind the target 410. The projector 200D upwardly irradiates the surface of a helicopter that is the target 410 with projection light from the front of the target 410. If there is no need to distinguish between the projectors 200A, 200B, 200C, and 200D, the following describes them as the projector(s) 200. Note that FIG. 7 omits a support that supports the projector 200. In addition, FIG. 7 schematically illustrates projection light radiated from the projector 200 with dashed lines.

Except that the projection control apparatus 300 transmits the image data of projection images to the four projectors 200, the projection control apparatus 300 is configured in a similar way in which the projection control apparatus 100 according to the first example is configured. Specifically, the controller 130 of the projection control apparatus 300 functions as a projection data generator 332. The projection data generator 332 transmits, among the four of an upper left projection image, an upper right projection image, a lower left projection image, and a lower right projection image divided from a projection image, the upper left projection image data to the projector 200A, transmits the upper right projection image data to the projector 200B, transmits the lower left projection image data to the projector 200C, and transmits the lower right projection image data to the projector 200D. Then, in FIG. 7, the respective projection light beams of the projectors 200 are all combined to display an image of the whole projection surface of the target 410. Note that at least parts of the respective projection light beams of the projectors 200 may overlap. In addition, the number of projectors 200 is not limited to four, but may be three or less, or five or more.

The projection data generator 332 according to the second example projects information indicating the border (i.e., border between painting colors) of painting applied to the surface of the target 410 on the surface of the target 410. Here, as the information indicating a border, a borderline 420 is displayed on the target 410.

On receiving input information indicating that projection is begun according to a manipulation on the input interface 110, the projection data generator 332 reads out the image data of an image including the borderline 420 from the storage unit 120. Note that the projection data generator 332 may acquire image data through communication via a LAN and the like. Next, the projection data generator 332 performs processing of associating the image of the read-out data with the shape of the surface of the target 410 on the read-out image data to generate projection data. At this time, the upper left projection data of the projection surface is generated on the basis of the projection position of the projector 200A, the upper right projection data of the projection surface is generated on the basis of the projection position of the projector 200B, the lower left projection data of the projection surface is generated on the basis of the projection position of the projector 200C, and the lower right projection data of the projection surface is generated on the basis of the projector 200D. Then, the projection data generator 332 transmits the upper left projection data of the projection surface to the projector 200A, transmits the upper right projection data of the projection surface to the projector 200B, transmits the lower left projection data of the projection surface to the projector 200C, and transmits the lower right projection data of the projection surface to the projector 200D. This allows the borderline 420 to be projected on the target 410.

The painting operation includes a method for painting an area that has not been subjected to masking after masking an area that is not painted, and a method for applying painting with no masking applied. In the method for applying masking, the borderline 420 is displayed on the target 410, and thus an operator can paste a masking tape to the target 410 along the displayed borderline 420.

After pasting a masking tape, the operator disposes a masking sheet in an area of the surface of the target 410 other than the areas having painting colors. A masking sheet is disposed such that the position of the edge of the masking sheet extends along the masking tape. Then, the operator sprays a paint having a predetermined color on an area that is not covered with a masking tape and a masking sheet.

The operator repeats pasting a masking tape, disposing a masking sheet, and spraying paint for each color. Paint may be sprayed such that neighboring colors do not overlap, or parts of neighboring colors overlap.

In the method for applying painting with no masking applied, the borderline 420 is displayed on the target 410, and thus the operator can paint an area while paying attention such that the paint does not run over into the next area beyond the borderline 420.

After a painting operation, the operator performs an inspecting operation for the painting operation. The borderline 420 is displayed on the target 410, and thus the operator can inspect the target 410 on the basis of the displayed borderline 420.

As described above, in the image projection apparatus 2 according to the second example, the borderline 420 indicating the border of painting applied to the surface of the target 410 to be manufactured is displayed on the target 410. Therefore, the image projection apparatus 2 according to the second example makes it possible to easily and accurately perform a masking operation along the borderline 420 displayed on the target 410. In addition, the image projection apparatus 2 according to the second example uses the borderline 420 displayed on the target 410 to clearly indicate the border of painting. Therefore, even if a painting operation is performed with no masking applied, it is possible to accurately apply painting. In addition, the image projection apparatus 2 according to the second example makes it possible to promptly perform an inspecting operation for a painting operation. In addition, with the image projection apparatus 2 according to the second example, no text or figure distorts after painting.

Thus, the image projection apparatus 2 according to the second example makes it possible to efficiently manufacture the target 410.

In addition, in the second example, not only the borderline 420 indicating the border of painting, but, for instance, color information indicating a paint color, and material information indicating the type of paint may also be projected on the target 410 in association with a painting position. For instance, color information and material information of painting of an area divided by the borderline 420 may be displayed inside the area. In addition, an operation procedure (e.g., painting color order) may be projected on the target 410, and a projection image representing a completed operation may be changed. In addition, the notes or the like regarding a painting operation may be projected on the target 410. If such information is displayed on the target 410, it is possible to more efficiently perform a painting operation, and prevent an operational error.

Note that, in the second example, the border between paint colors in camouflage painting is projected on the target 410. However, the type of painting is not limited to a camouflage painting, but it is possible to apply the image projection apparatus 2 according to the second example to painting in general.

In addition, in the second example, as information indicating the border of painting, the borderline 420 is displayed. However, the information indicating the border of painting is not limited to the borderline 420. For instance, different display colors may be used for neighboring areas in a projection image, and the border between the different display colors in the projection image may be used as information indicating the border of painting.

In addition, by projecting projection images such that the projection light beams of the projectors 200 overlap on the projection surface or increasing the number of projectors 200, an operator may use his or her hand or the like to prevent an image displayed on the target 410 from being invisible.

Third Example

Figure 8:
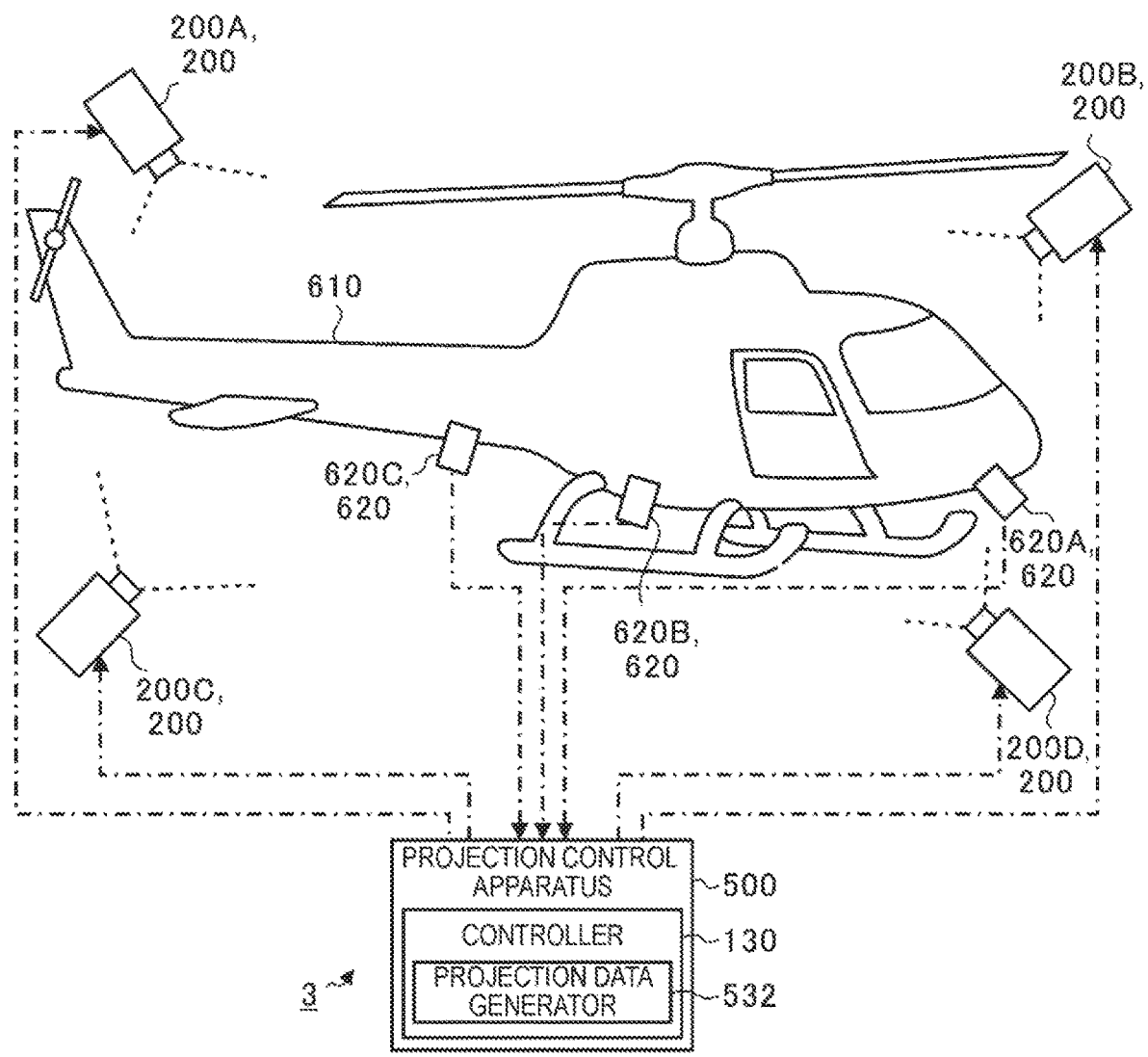
FIG. 8 is an explanatory diagram describing an image projection apparatus according to a third example.

FIG. 8 is an explanatory diagram describing an image projection apparatus 3 according to a third example. FIG. 8 illustrates a flow of signals with a one-dot chain line arrow. The image projection apparatus 3 projects an image on the surface of an aircraft (here, helicopter) that has not been painted, and makes the surface of the aircraft look as if the surface of the aircraft was painted. The image projection apparatus 3 is applied, for instance, to a showroom and a dealer store.

The image projection apparatus 3 includes a projection control apparatus 500, the four projectors 200A, 200B, 200C and 200D, and three color tone sensors 620A, 620B and 620C. In addition, in the third example, a helicopter whose surface has not yet been painted is a target 610 on which a projection image is projected.

The projectors 200A to 200D are disposed at positions similar to those of the second example for a helicopter that is the target 610. If there is no need to distinguish between the projectors 200A to 200D, the following describes them as the projector(s) 200. Note that FIG. 8 omits a support that supports the projector 200. In addition, the number of projectors 200 is not limited to four, but may be three or less, or five or more. In addition, FIG. 8 schematically illustrates projection light radiated from the projector 200 with dashed lines.

The color tone sensors 620A, 620B, and 620C detect the color tone of the surface of the target 610. For instance, the color tone sensors 620A, 620B, and 620C irradiate the surface of the target 610 with light, and detect the density of the respective reflection light beams of red light (R), green light (G), and blue light (B) in the reflection light reflected by the target 610. As a result, with the density balance between the respective reflection light beams of the red light (R), the green light (G), and the blue light (B), the color tone of the target 610 is detected. Detection results of the color tone sensors 620A, 620B, and 620C are transmitted to the projection control apparatus 500. When the color tone sensors 620A, 620B, and 620C are not distinguished, the following describes them as the color tone sensor(s) 620.

The color tone sensor 620A is disposed close to the front of a helicopter that is the target 610, the color tone sensor 620B is disposed around the center of a helicopter that is the target 610, and the color tone sensor 620C is disposed close to the back of a helicopter that is the target 610. The color tone sensors 620 detect the color tone of the surface near the place in which the color tone sensors 620 are disposed on the surface of the target 610. FIG. 8 omits a support that supports the color tone sensor 620. Note that the number of color tone sensors 620 is not limited to three, but may be two or less, or four or more. In addition, the mode in which a measurement position of the color tone sensor 620 is fixed is not limitative, but a measurement position of the color tone sensor 620 may be automatically or manually variable.

The projection control apparatus 500 is configured in a similar way in which the projection control apparatus 300 according to the second example is configured. Specifically, the controller 130 of the projection control apparatus 500 functions as a projection data generator 532. The projection data generator 532 divides a projection image into four, and transmits the projection data of the divided projection images to the respective projectors 200. Note that at least parts of the respective projection light beams of the projectors 200 may overlap.

The projection data generator 532 according to the third example projects a projection image representing the painted external appearance of the target 610 on the surface of the target 610. The projection image representing the painted external appearance of the target 610 is a color image that is colored.

Specifically, on receiving input information indicating that projection is begun according to a manipulation on the input interface 110, the projection data generator 532 reads out the image data indicating an image of the painted target 610 from the storage unit 120. Note that the projection data generator 532 may acquire image data through communication via a LAN and the like. Next, the projection data generator 532 performs processing of associating the image of the read-out data with the shape of the surface of the target 610 on the read-out image data to generate projection data. At this time, the upper left projection data of the projection surface is generated on the basis of the projection position of the projector 200A, the upper right projection data of the projection surface is generated on the basis of the projection position of the projector 200B, the lower left projection data of the projection surface is generated on the basis of the projection position of the projector 200C, and the lower right projection data of the projection surface is generated on the basis of the projection position of the projector 200D. Then, the projection data generator 532 transmits the upper left projection data of the projection surface to the projector 200A, transmits the upper right projection data of the projection surface to the projector 200B, transmits the lower left projection data of the projection surface to the projector 200C, and transmits the lower right projection data of the projection surface to the projector 200D. This allows a colored projection image to be projected on the target 610.

A projection image is projected on the surface of the target 610, and thus the color tone sensor 620 detects the actual color tone where the color of the surface of the original target 610 on which no projection light is projected overlaps with the color of projection light projected on the target 610. Therefore, a detection result of the color tone sensor 620 is different from the color of the projection light in accordance with the color of the surface of the original target 610.

Then, the projection data generator 532 adjusts the color of the projection light on the basis of a detection result of the color tone sensor 620 such that the color tone detected by the color tone sensor 620 has a predetermined value (color value indicating a correct color after painting).

For instance, it is assumed that a target color (correct color after painting) within the detection range of the color tone sensor 620A on the surface of the target 610 is blue. In this case, it is assumed that the projection data generator 532 projects projection light in blue that is a target color within the detection range of the color tone sensor 620A. It is then assumed that the color of the surface of the original target 610 causes a detection result of the color tone sensor 620A to indicate green.

At this time, the projection data generator 532 compares the target color (blue) with the detection color (green) of the color tone sensor 620A with the detection result of the color tone sensor 620A considered correct, and determines whether the target color agrees with the detection color. Here, for instance, the storage unit 120 stores, in advance, reference data serving as a comparison reference. These reference data are adapted to the color tone characteristics of the color tone sensor 620A. The projection data generator 532 refers to the data of a target color in the reference data, and makes a comparison with the detection color. Specifically, the projection data generator 532 compares the balance between the respective components of RGB in the target color with the balance between the respective components of RGB in the detection color, and determines whether they agree on the balance between the respective components of RGB.

If the target color does not agree with the detection color, the projection data generator 532 changes the color of the projection light projected within the detection range of the color tone sensor 620A from the last color (blue). For instance, the projection data generator 532 compares the respective components of RGB in the target color with the respective components of RGB in the detection color, extracts a difference for each component, and changes the color tone of the projection light by that difference.

Next, the projection data generator 532 projects the projection light whose color tone is changed within the detection range of the color tone sensor 620A. Next, the projection data generator 532 acquires a detection result of the color tone sensor 620A again, and compares the target color with the detection color acquired again. Then, the projection data generator 532 repeats the above-described processing until the target color agrees with a detection color.

In this way, the projection data generator 532 changes projection light from a target color on the basis of a detection result of the color tone sensor 620A to adjusts the detection color of the color tone sensor 620A as the target color. Note that the color tone sensor 620A has been described, but the same applies to the other color tone sensors 620B and 620C.

As described above, in the image projection apparatus 3 according to the third example, a projection image representing the painted external appearance is displayed on the surface of the target 610, and the color tone of the projection image is adjusted such that the color tone of the surface of the target 610 has a predetermined value. This allows the image projection apparatus 3 according to the third example to express the painted external appearance of the body on the actual body before painting.

Thus, the image projection apparatus 3 according to the third example makes it possible to check the painted external appearance on the actual body before painting.

In addition, in the third example, not only the color of the target 610, but, for instance, a logo mark and text displayed by painting on the surface of the target 610 may be projected on the target 610 in association with positions at which they should be displayed. In this mode, it is possible to check the painted external appearance more accurately.

In addition, a comparison between a target color and a detection color is not limited to the mode for comparing the balance between the respective components of RGB. For instance, the projection data generator 532 may compare the intensity of the respective components of RGB in a target color with the intensity of the respective components of RGB in a detection color. In addition, a specific mode in which the color tone of projection light is changed is not limited to a mode in which the respective components of RGB in a target color are compared with the respective components of RGB in a detection color to extract a difference for each component. For instance, a trial and error mode may be adopted in which two of the respective components of RGB in projection light are fixed, and the remaining component is changed.

In addition, the projection data generator 532 may adjust the darkness, brightness, or the like of projection light on the basis of an exposure environment (e.g., sunlight or indoor lighting) of the target 610.

In addition, the color tone sensor 620 can favorably detect a color tone with sensitivity close to that of the human eyes. In addition, the projection data generator 532 may adjust a detection result of the color tone sensor 620 such that a detection color of the color tone sensor 620 agrees with a color visually recognized by a human.

Note that the image projection apparatus 3 according to the third example is not only applied to a scene in which a body is newly manufactured, but a scene in which the painting of a body that has already been painted is changed.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

In each of the above-described examples, an image is projected with an aircraft or a component of an aircraft used as the targets 210, 410, and 610. However, a target on which an image is projected is not limited to an aircraft, but, for instance, an image may be projected with a vehicle or a component of a vehicle used as a target.

INDUSTRIAL APPLICABILITY

The present invention is applicable to an image projection apparatus.

The invention claimed is:

1. An image projection apparatus comprising:
   a projector configured to project an image;
   a projection control apparatus configured to cause the projector to project, on a surface of a target to be manufactured, a processing information regarding a processing or an assembly information regarding an assembly to be performed for the target,
   wherein the projection control apparatus is configured to:
      read out, from a storage unit, image data indicating a position at which a perforation guide sheet is to be disposed; and
      cause the projector to project on the surface of the target information indicating the position at which the preformation guide sheet is to be disposed;
   wherein the perforation guide sheet is disposed on the surface of the target on a basis of the projected information indicating the position at which the perforation guide sheet is to be disposed,
   wherein the perforation guide sheet is a physical guide sheet, and
   wherein the perforation guide sheet defines a hole indicating a position of a perforating operation.

2. The image projection apparatus according to claim 1, wherein
   the projection control apparatus causes an information indicating an operation procedure of an operation performed for the target to be projected, and causes a projection image regarding a predetermined operation to be changed into a mode indicating a completion of the predetermined operation on a basis of an input information indicating a completion of the predetermined operation in the operation procedure.

3. The image projection apparatus according to claim 1, wherein
   the projection control apparatus causes an information regarding a processing performed on a hole made on the target to be projected in association with the hole subjected to the processing.

4. The image projection apparatus according to claim 2, wherein
   the projection control apparatus causes an information regarding a processing performed on a hole made on the target to be projected in association with the hole subjected to the processing.

5. The image projection apparatus according to claim 1, wherein
   the projection control apparatus causes an information regarding an assembling operation to be projected in association with a hole through which an operation is performed, the assembling operation using the hole made on the target.

6. The image projection apparatus according to claim 2, wherein
   the projection control apparatus causes an information regarding an assembling operation to be projected in association with a hole through which an operation is performed, the assembling operation using the hole made on the target.

7. The image projection apparatus according to claim 3, wherein
   the projection control apparatus causes an information regarding an assembling operation to be projected in association with a hole through which an operation is performed, the assembling operation using the hole made on the target.

8. The image projection apparatus according to claim 4, wherein
   the projection control apparatus causes an information regarding an assembling operation to be projected in association with a hole through which an operation is performed, the assembling operation using the hole made on the target.

9. The image projection apparatus according to claim 1, wherein the projection control apparatus is configured to cause the projector to:
   project a text description on the target regarding one or more operations to be completed; and
   project a revised text description on the target indicating completion of one or more operations.

10. The image projection apparatus according to claim 1, wherein the projection control apparatus is configured to:
    determine whether an operation is completed based on image analysis of an image captured by a camera; and
    change a display mode of a projection image projected by the projector after determining that the operation is completed.

11. The image projection apparatus according to claim 1, further comprising a laser configured to scan the surface of the target, wherein the projection control apparatus is configured to:
    determine whether an operation is completed by determining whether the laser makes a hole at a predetermined position; and
    change a display mode of a projection image projected by the projector after determining that the operation is completed.

* * * * *